(12) United States Patent
Bettinger

(10) Patent No.: US 6,394,601 B1
(45) Date of Patent: May 28, 2002

(54) SPECTACLE-MOUNTED MICRO DISPLAY OCULAR

(76) Inventor: David S. Bettinger, 8030 Coventry, Grosse Ile, MI (US) 48138-1119

(*) Notice: Subject to any disclaimer, the term of this patent is extended or adjusted under 35 U.S.C. 154(b) by 14 days.

(21) Appl. No.: 09/618,584

(22) Filed: Jul. 17, 2000

(51) Int. Cl.⁷ .................................................. G02C 1/00
(52) U.S. Cl. .......................................... 351/158; 351/41
(58) Field of Search ................................ 351/158–159, 351/41, 50–52; 359/630–633

(56) References Cited

U.S. PATENT DOCUMENTS 4,806,011 A * 2/1989 Bettinger ................. 351/158
5,162,828 A * 11/1992 Furness et al. ............. 359/618
5,539,422 A * 7/1996 Heacock et al. ............ 359/631

* cited by examiner

Primary Examiner—Jordan M. Schwartz

(57) ABSTRACT

A spectacle-mounted micro display ocular uses a single concave spherical mirror to provide an image at infinity of a micro display object mounted on the brow of a spectacle frame. In the preferred embodiment the relay mirror is located outside the normal forward view and in an area normally occulted by a portion of the nose to provide a visual monitor for information sources limited to several lines of digits, numerals, lights, signals or letters such as time, temperature, heart rate, speed, equipment status, alarms, phone numbers, abbreviated cellular phone messages and the like.

5 Claims, 1 Drawing Sheet

SPECTACLE-MOUNTED MICRO DISPLAY OCULAR

FIELD OF THE INVENTION

The present invention is directed to apparatus for mounting on spectacles for personal display of optical information using the concave spherical surface of a relay mirror as a primary reflector.

DESCRIPTION OF THE PRIOR ART

In the prior art for glasses mounted displays the goal has been to provide the equivalent display for a personal computer leading to heavy and bulky optics. In the prior art Bettinger in U.S. Pat. No. 4,806,011 discloses a compact spectacle-mounted ocular display apparatus that requires two mirrored optical elements, a primary and a relay mirror. The mirroring of the primary mirror is a difficult step for prescription glasses where the prescription and the display magnification on a lens surface must both be accommodated.

Objects of the Invention

The general object of this invention is to provide a simple visual monitor for information sources limited to several lines of several digits, numerals, lights, signals and letters such as time, temperature, heart rate, speed, equipment status, alarms, phone numbers, abbreviated cellular phone messages and the like. Such displays are limited to resolutions of one quarter VGA (180 by 120 pixels) or less.

Another object of this invention is to provide a small display oriented and positioned in such a way as to not occult or hinder the viewers forward vision because the image is presented as an overlay of an already occulted area of view such as that presented by the nose or because the image is presented in an area that outside and below the normal forward viewing area.

It is yet another object of this invention to provide equipment and vehicle monitoring information in the lower quadrant of view already favored by many viewers because of their long experience in observing automotive instrument panels in this viewing area. Another object of this invention is to provide the shortest possible optical distance between the eye and the object so that focusing movements will be small. It will be understood by one skilled in the art that various movable mounting means for both the display screen and the relay mirror can be accommodated within the present invention.

DETAILED DESCRIPTION OF THE DRAWINGS

In the five figures described, the same numbers are used for the same components of the invention in all figures.

Figure 1:
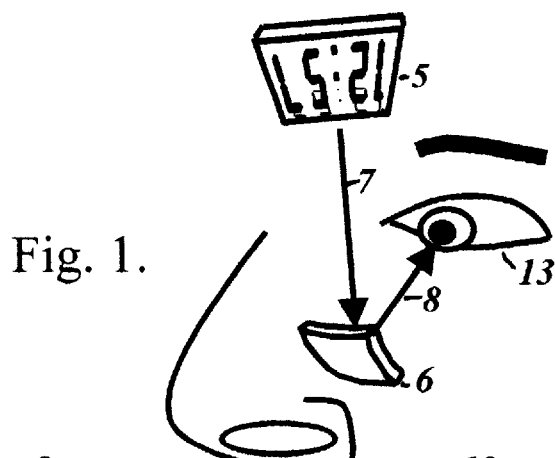
FIG. 1 is a fragmentary perspective schematic useful in explaining the current invention.

In FIG. 1 the display screen 5 is shown at the brow level. The viewer's eye 13 looks downward along sight line 8 to the concave spherical relay mirror 6 which presents an image of the object, in this case a digital time screen 5 along sight line 7.

Figure 2:
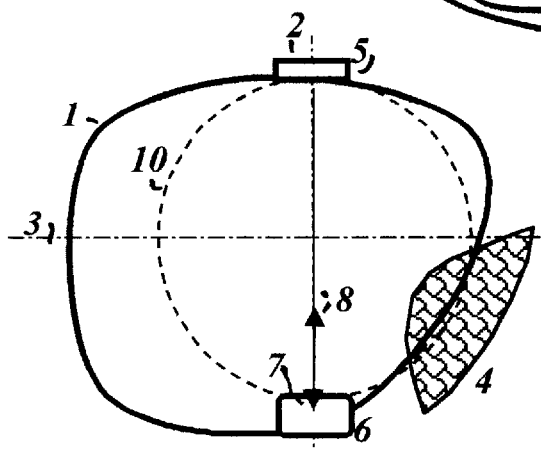
FIG. 2 is a view through a left spectacle lens showing the general principle of the current invention at its center line limit.

In FIG. 2 the viewing area through a normal spectacle lens is bounded by the lens area 1. The minimal spectacle viewing area is circumscribed by the dashed circular line 10. The horizontal 3 and vertical 2 centers of the eye are indicated by dashed lines. The nose area 4 normally obstructs the view. A micro display screen 5 provides a line of view 7 to the relay mirror 6 than in turn provides a line of view 8.

Figure 3:
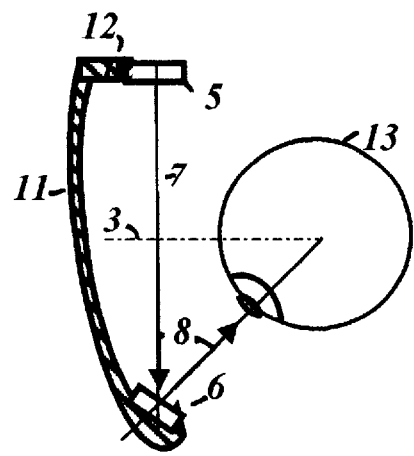
FIG. 3 is a section though the spectacle lens and frame of FIG. 2.

In FIG. 3 the eye 13 has rotated down to sight on the relay mirror 6 along sight line 8. The relay mirror 6 reflects and magnifies the display 5 as an object viewed along sight line 7. Both the relay mirror 6 and the display 5 are secured by mounting means 12 to the glasses frame 11. The relay mirror 6 is positioned within the lower nasal quadrant of the viewer's forward view. The relay mirror 6 is positioned at a distance from the center of forward view that is greater that the distance from the center of view to the highest forward view being inscribed by circle 10.

Figure 4:
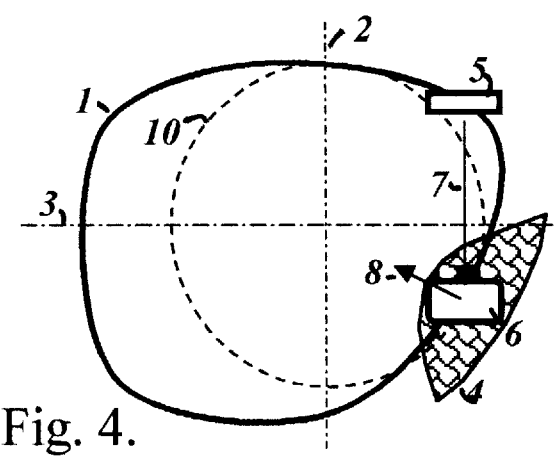
FIG. 4 is a view through a left spectacle lens showing the preferred embodiment.

In FIG. 4 the viewing area through a normal spectacle lens is bounded by the lens area 1. The minimal spectacle viewing area is circumscribed by the dashed circular line 10. The horizontal 3 and vertical 2 centers of the eye are indicated by dashed lines. The nose area 4 normally obstructs the view. A micro display screen 5 provides a line of view 7 to the relay mirror 6 that in turn provides a line of view 8 to the eye. The preferred embodiment of the ocular display apparatus being whereby said relay mirror 6 is positioned within the forward area of view occulted by the nose.

Figure 5:
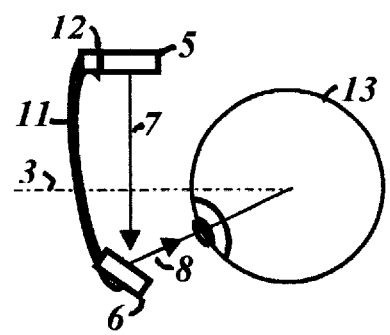
FIG. 5 is a section through the spectacle lens and frame of FIG. 4.

In FIG. 5 the preferred embodiment of the ocular display apparatus comprising spectacles including a frame 11 for mounting on a wearer's head and a micro display screen 5 with means for attachment 12 to the interior brow of said spectacle frame 11, optically communicating 7 with a relay mirror 6 with means for attaching to said interior lower nasal quadrant of said spectacle frame 11 positioned to intercept and reflect said visible objective image onto said mirror surface, and being reflected by said relay mirror surface 6 to a wearer's eye 13 to form a virtual image of said micro display screen 5 of infinity. The ocular display apparatus relies upon the optical element where said relay mirror 6 comprises a concave spherical reflector.

The invention claimed is:

1. Ocular display apparatus comprising

Spectacles including a frame for mounting on a wearer's head and a micro display screen which provides a visible objective image with means for attaching to the upper interior region of said spectacle frame adjacent to the brow of the wearer, optically communicating with a relay mirror with means for attaching to said interior lower nasal quadrant of said spectacle frame positioned to intercept and reflect said visible objective image onto said mirror surface, and being reflected by said relay mirror surface to a wearer's eye to form a virtual image of said micro display screen of infinity, wherein said relay mirror is positioned at a distance from the center of forward view that is greater than the distance from the center of view to the highest forward view.

2. The ocular display apparatus of claim 1 whereby said relay mirror is positioned within the viewer's forward area of view that is occulted by the nose whereby said relay mirror introduces no further obstruction of view.

3. The ocular display apparatus of claim 1 whereby said relay mirror comprises a concave spherical reflector.

4. The ocular display apparatus of claim 1 whereby said relay mirror is positioned within the lower nasal quadrant of the viewer's forward view.

5. The ocular display apparatus of claim 1 whereby said display screen is selected to provide a visual monitor for information sources limited to several lines of several digits, numerals, lights, signals and letters.

* * * * *